BEST AVAILABLE COPY

A. A. PARKER & J. F. LANDERS.

FENCE MAKING MACHINE.

No. 11,044. Reissued Nov. 26, 1889.

Witnesses.
Bessie Brooks.
Roy S. Gaskill.

Inventors.
Arthur A. Parker
John F. Landers
By Paul Newman Atty.

N. PETERS, Photo-Lithographer, Washington, D. C.

A. A. PARKER & J. F. LANDERS.

FENCE MAKING MACHINE.

No. 11,044. Reissued Nov. 26, 1889.

Witnesses
Bessie Booth
Roy S. Gaskill.

Inventors
Arthur A. Parker
John F. Landers
By Paul & Munn Attys

N. PETERS, Photo-Lithographer, Washington, D. C.

A. A. PARKER & J. F. LANDERS.

FENCE MAKING MACHINE.

No. 11,044. Reissued Nov. 26, 1889.

Witnesses.
Bessie Booth
Roy S. Gaskill

Inventors
Arthur A. Parker
John F. Landers
By Paul Munn attys

N. PETERS. Photo-Lithographer, Washington, D. C.

A. A. PARKER & J. F. LANDERS.

FENCE MAKING MACHINE.

No. 11,044. Reissued Nov. 26, 1889.

Witnesses.
Bernie Booth
Roy. S. Gaskill.

Inventors
Arthur A. Parker
John F. Landers
By Pauel Merwin attys.

N. PETERS, Photo-Lithographer, Washington, D. C.

A. A. PARKER & J. F. LANDERS.

FENCE MAKING MACHINE.

No. 11,044. Reissued Nov. 26, 1889.

Witnesses
Bessie Booth
Roy S. Gaskill

Inventors.
Arthur A. Parker
John F. Landers
By Paul & Neuman Attys.

N. PETERS, Photo-Lithographer, Washington, D.C.

A. A. PARKER & J. F. LANDERS.

FENCE MAKING MACHINE.

No. 11,044. Reissued Nov. 26, 1889.

Witnesses.
Bessie Booth
Roy S. Gaskill

Inventors.
Arthur A. Parker
John F. Landers
By Paul Wernig Attys.

N. PETERS, Photo-Lithographer, Washington, D. C.

UNITED STATES PATENT OFFICE.

ARTHUR A. PARKER AND JOHN F. LANDERS, OF JERSEY CITY, NEW JERSEY.

FENCE-MAKING MACHINE.

SPECIFICATION forming part of Reissued Letters Patent No. 11,044, dated November 26, 1889.

Original No. 401,298, dated April 9, 1889. Application for reissue filed September 17, 1889. Serial No. 324,269.

*To all whom it may concern:*

Be it known that we, ARTHUR A. PARKER and JOHN F. LANDERS, both citizens of the United States, and both residing at Jersey City, in the county of Hudson and State of New Jersey, have invented a new and useful Improvement in Fence-Making Machines, of which the following is a specification.

This invention relates to improvements in machines for the manufacture of wire-and-picket fence; and the invention consists, generally, in the constructions and combinations hereinafter described, and particularly pointed out in the claims.

Figure 1:
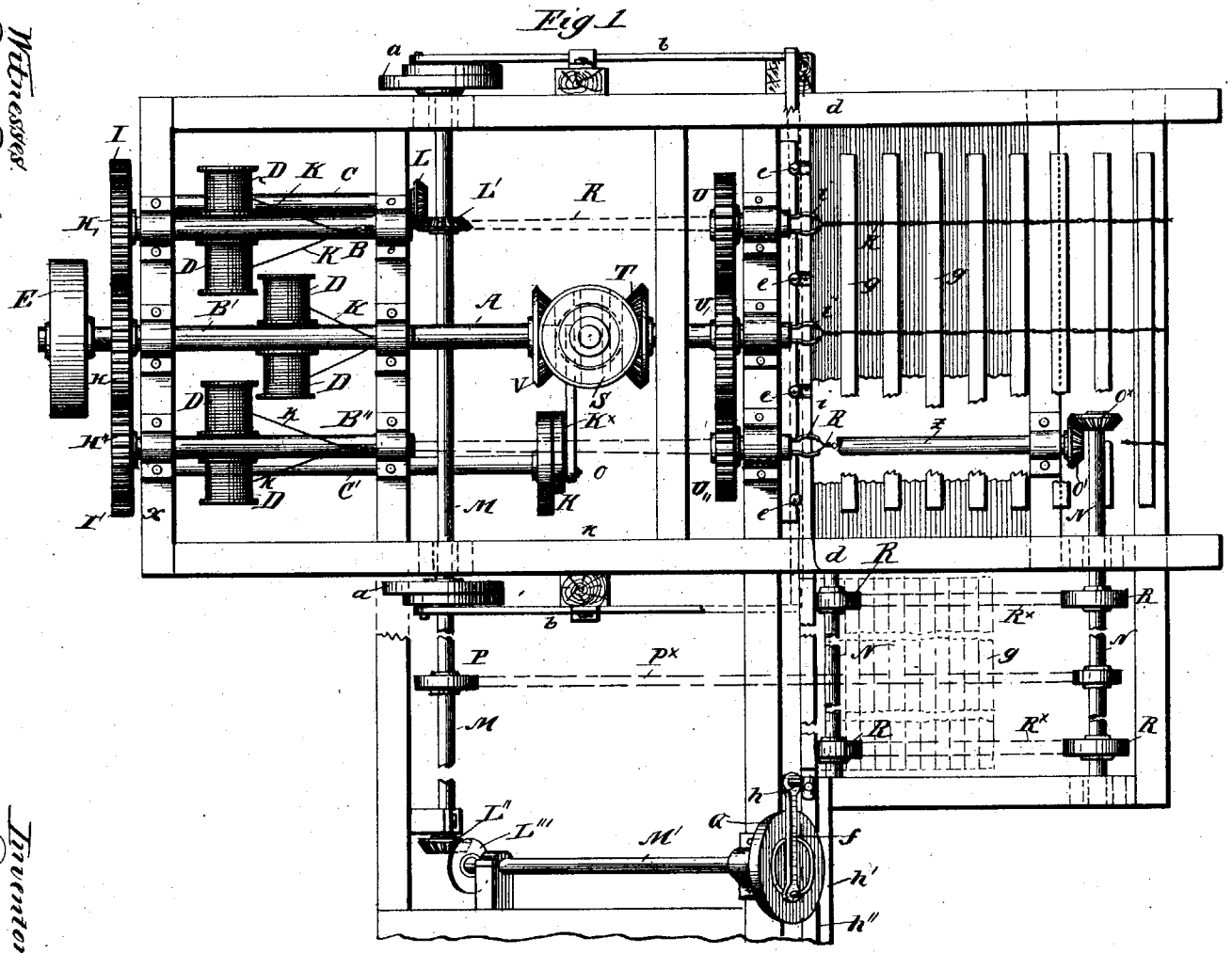
Figure 2:
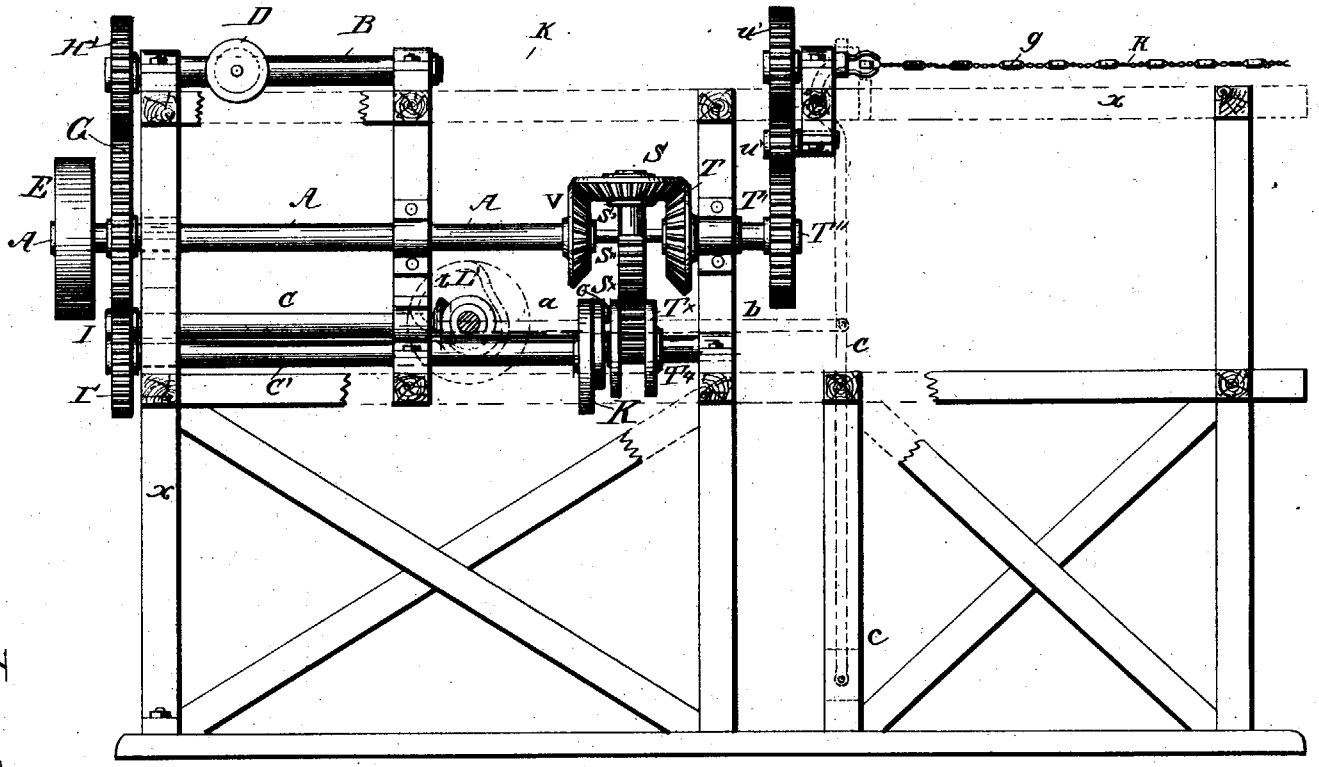
Figure 3:
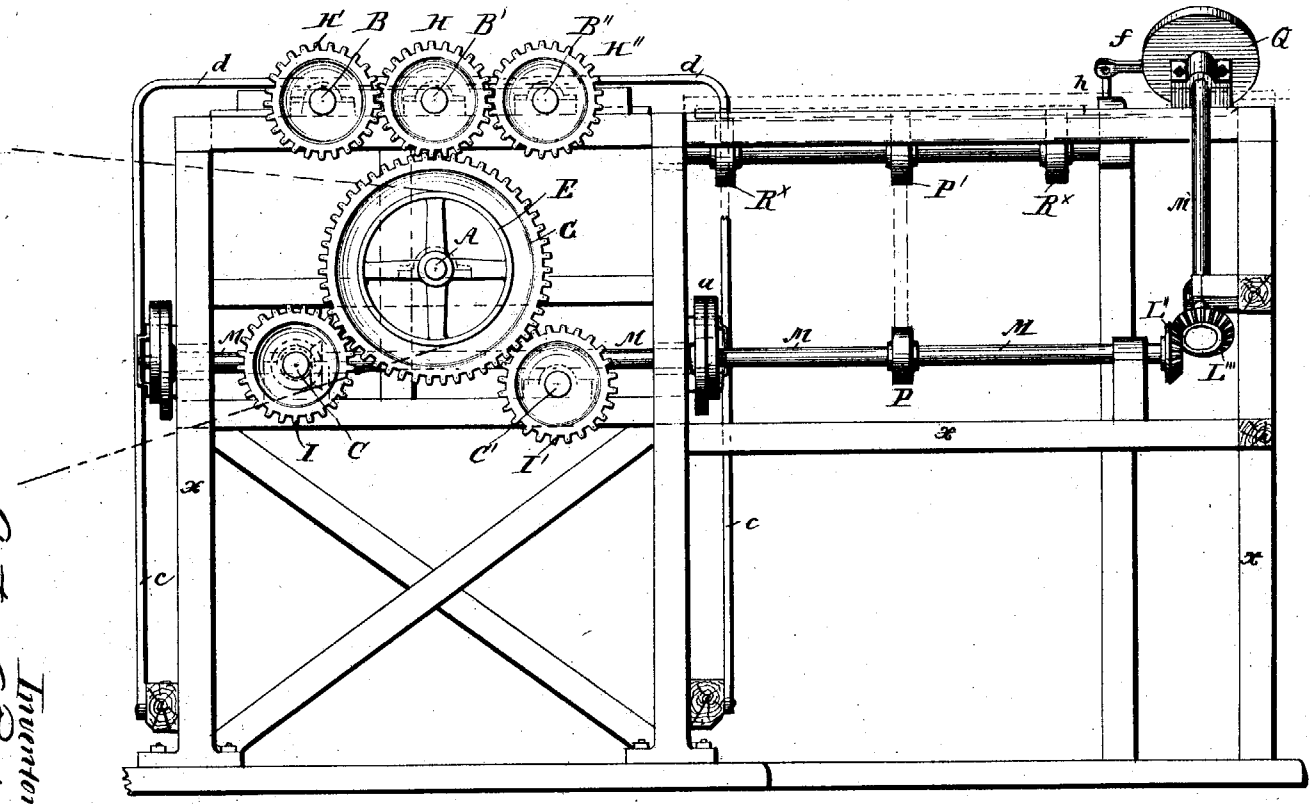
Figure 4:
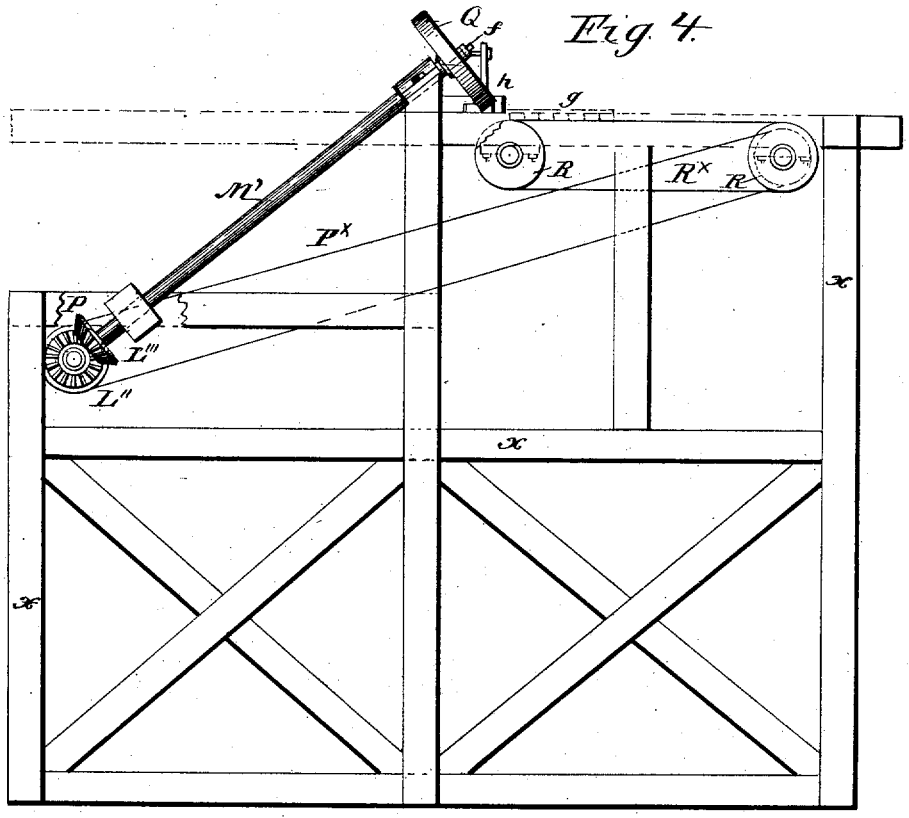
Figure 6A:
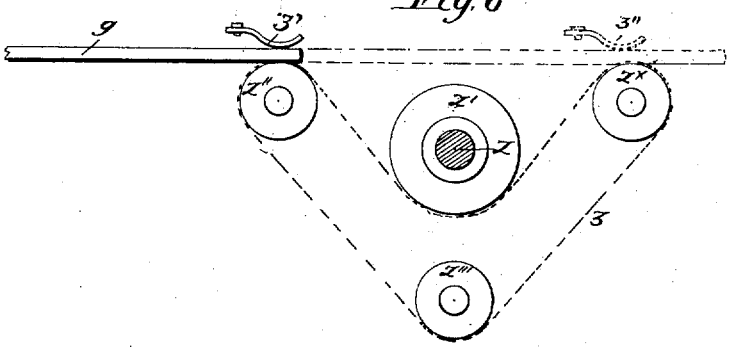
Figure 6:
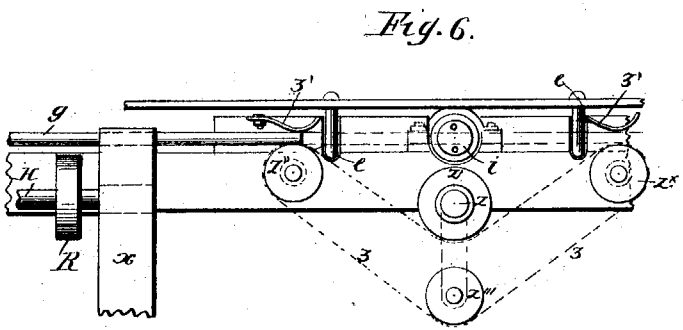
Figure 5:
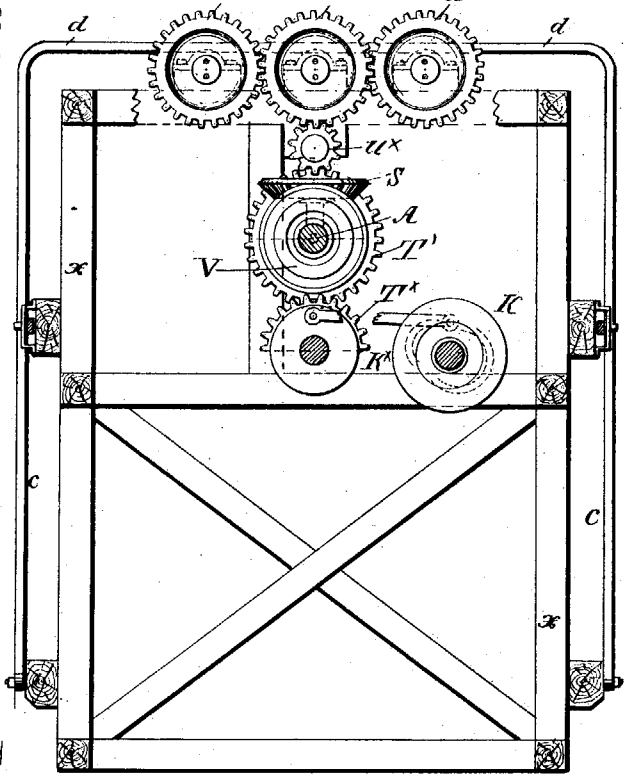
Figure 7:
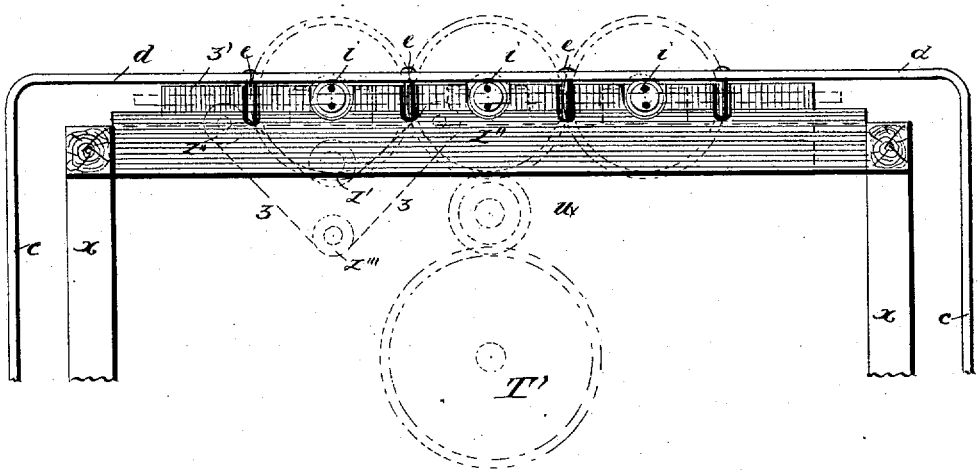
Figure 9:
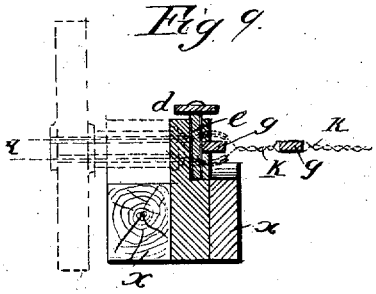
Figure 8:
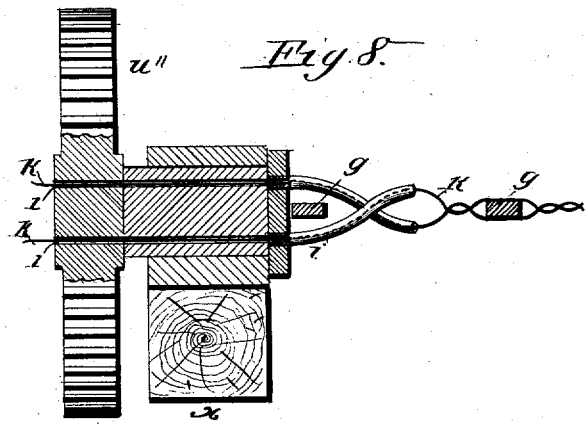
Figure 10:
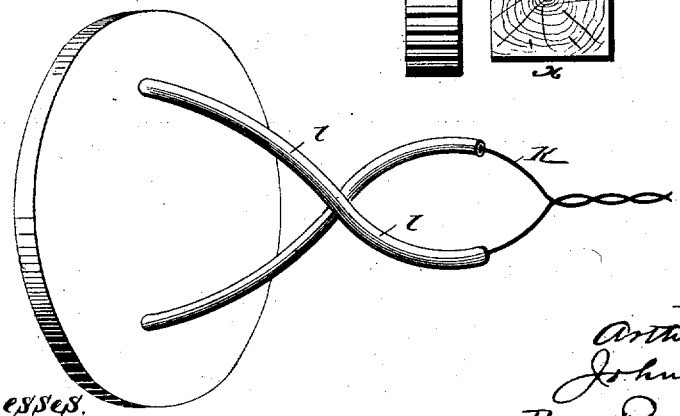

Figure 1 is a plan view illustrating the top of our newly-invented fence-making machine. Fig. 2 is a vertical sectional view of the same. Fig. 3 is an end view of the same in elevation. Fig. 4 is a partial side view of the same. Fig. 5 is another sectional view of the same. Fig. 6 is a detail view illustrating a part of the picket-feed of the machine. Fig. 6[a] illustrates the same picket-feed. Fig. 7 is a transverse sectional view further illustrating said machine. Fig. 8 is a partial sectional view taken through the axial center of the wheel U″ of Fig. 7. Fig. 9 is another partial sectional view taken on a line between the wheels U and U′ of Fig. 7. Fig. 10 is a detail view illustrating one of the pairs of twisting-fingers of said machine.

X designates the frame of the machine. Upon this is journaled the main shaft A, in boxes of any convenient and well-known form. One end of said shaft A projects without said frame. Upon this end is mounted the spur-wheel G and the pulley E, both outside of the frame. Upon the frame X is also journaled in suitable bearings three or more shafts B B′ B″, parallel to each other and parallel to said main shaft. Upon these auxiliary shafts B B′ B″ are mounted the spur-wheels H H′ H″, the wheel H gearing into the wheel G of the main shaft. Upon these shafts B B′ B″ are mounted the spools D, upon which wire is wound. The wire of each spool passes through a conduit in the inner end of the shaft on which it is mounted. As the spool-frames are supported upon the auxiliary shafts B B′ B″, they are all rotated by the means described from the main shaft at a uniform rate of speed.

The main shaft A extends within the machine, and upon its inner end is mounted the bevel-wheel V. Another auxiliary shaft C′ is journaled in bearings on said frame parallel to said main shaft. Mounted on the outer end of this shaft C′ is the spur-wheel I′, which meshes into the spur-wheel G upon the main shaft A. Upon the inner end of this shaft C′ is mounted the disk-wheel K. This disk-wheel is constructed with an eccentric groove in its face. A connecting-bar K[×] couples this disk-wheel to the segmental spur-wheel T[×]. This wheel is mounted on a shaft T[4], which is journaled in suitable bearings on the frame of said machine. This shaft is directly below the inner end of the main shaft A. Directly above this, carried upon the lower end of the oscillating shaft S′ and meshing into the wheel T[×], is the segmental spur-wheel S[×]. The oscillating shaft S′ is carried by a shaft S″, journaled in the middle of the main shaft, and of a short shaft T″, journaled in said frame directly opposite to and concentric with said main shaft, so that the perimeter of said segmental wheel S[×] and the motion of the said oscillating shaft S′ are concentric with the main shaft A.

The bevel-wheel S is mounted on the upper end of the shaft S′ and meshes into the bevel-wheel V upon the main shaft A. Upon the shaft T″ is mounted a bevel-wheel T, which meshes into the wheel S. Upon this shaft T″ is also mounted a spur-wheel T′, which meshes into an intermediate spur-wheel U[×], which is mounted upon a proper bearing in the frame of said machine. Into this intermediate wheel U[×] meshes the spur-wheel U′. The spur-wheels U, U′, and U″ all mesh together and are mounted on one end of short shafts journaled in bearings on the top of said machine. Upon the other end of each of these shafts is mounted a pair of twisting-fingers. (Designated by *i*.) These fingers, which are tubular, are each bent into helical form, like the thread of a screw. Two conduits *l* run through the whole length of each of said shafts. One of these conduits connects with each of the said twisting-fingers, so that a wire from one of said spools D may be drawn through each of said conduits and each of said twisting-fingers, to be twisted upon the wood pickets while making the fence. These twisting-fingers are given their peculiar form in order that if the motion of the twisting-head should continue a little after the picket is put into the machine, (an effect of the inertia of the mechanism,) the twisting-fingers coming into contact with the picket will not be marred themselves, nor will they mar the picket, for, on account of their helical shape, they will in such case only act as a screw to push the picket a little way from the twisting-head. These twisting-fingers are also set a little apart, so that they will hold the wires, one on each side of the picket, in proper position to be twisted thereon, and, when twisted properly, to embrace said picket. The main shaft and the bevel-wheel V mounted upon it are in continuous rotation in one direction and the bevel-wheel S on the oscillating shaft is also in continuous rotation; but the bevel-wheel T on the short shaft receives rotary motion only as the wheel S is carried one way by the motion of the oscillating shaft, and when moving the other way this bevel-wheel on the oscillating shaft rolls over the wheel on the short shaft and imparts no motion to it. Thus, an intermittent motion is produced and the said wheel on the short shaft, the said short shaft, and the twisters propelled by them, are periodically still and periodically in motion at regular intervals, whereby, while the spool-frames are rotated at a uniform speed the twisters are given a variable speed. The periodical stoppages of the twisters are for the purpose of permitting the insertion of the pickets. When the twisters are in motion, they move at a higher rate of speed than the spool-frames in order to make up for the time that they are at rest. Upon said frame of said machine is also journaled another auxiliary shaft C. A spur-wheel I, mounted upon the outer end of this shaft, meshes into the spur-wheel G of the main shaft. A bevel-wheel L is mounted on the inner end of said shaft C. A cross-shaft M, journaled in proper bearings in the supporting-frame of said machine, is placed at right angles to the shaft C. Upon this shaft M is mounted a bevel-wheel L′, which meshes into the wheel L upon the shaft C. Two disk-wheels (designated by *a* and *a*) are also mounted upon this shaft M. In the face of each of these disk-wheels is an eccentric groove. *c d* represent an oscillating frame, which is pivotally attached to the supporting-frame of the machine. This frame *c d* is coupled with the eccentrics *a a* by means of connecting-bars *b*, which are pivotally connected by one end to the said oscillating frame, and upon the other end carry friction-rollers, which work in the eccentric grooves in the disk-wheels *a*, so that an intermittent oscillating motion of the frame *c d* is produced by the revolution of the disk-wheels *a a*. The upper part *d* of this frame *c d* is provided with downwardly-projecting fingers *e*, which work on either side of and between the twisting-fingers *i*. The bevel-wheel L″ is mounted upon the end of the shaft M. Meshing into this is a bevel-wheel L‴, mounted upon an inclined shaft M′. This shaft M′, which is journaled in proper bearings on the frame of said machine, extends diagonally upward above the top of said machine, and carries upon its top a disk-wheel Q. In the face of this wheel is an eccentric groove *h*′. The pin *h*″, carrying a friction-roller, works in this groove *h*′. The pin itself is carried by the connecting-bar *f*, which couples the slide *h* with said eccentric. This slide moves intermittingly backward and forward in a groove in the top of said machine as the disk-wheel Q revolves.

The pulley P is mounted upon the shaft M and connected with the pulley P′ of the shaft N by the belt P×. The shafts N and N carry pulleys R R R R, which are connected by the belts R× and R×. Upon the inner end of the outer shaft N is mounted a bevel-wheel O×, which meshes into another bevel-wheel O′, mounted upon one end of the shaft Z. This shaft Z is journaled in bearings upon the frame of the machine, and carries a pulley Z′ upon its inner end. Upon this, in connection with the pulleys Z″, Z‴, and Z×, is stretched the belt *z*, so that when the pulley Z′ revolves the belt travels over the said pulleys Z″ and Z×, being so placed that the belt *z* running over them will have its upper surface a little above the lower surface of the way through which a picket must travel to enter the machine. Above these pulleys Z″ and Z× are placed bent springs *z*′, to press said picket down upon said belt as it enters the machine.

This machine is used for making a fence with wooden pickets and wire. The ends of the wires *k*, which were wound upon the spools D, are brought through the conduits in the shafts and through the twisting-fingers, as hereinbefore described. The machine is then put in motion by means of a belt running on the pulley E and connecting with a power. Then the pickets to be secured in place are laid side by side parallel with each other across the belts R× R×, as illustrated by *g* in dotted lines in Fig. 1. The motion of these belts will carry the pickets toward the groove in which the slide *h* works. As soon as one of the pickets arrives at the proper place, it will be pushed endwise toward the fingers *i*. As soon as its end arrives between the belt *z* upon the pulley Z″ and the spring *z*′, it will by the action of said belt be carried forward into said machine between the twisting-fingers and into proper position to be made into fence. During this time the frame *c d* and the twisting-fingers *i* are still, and the fingers *e* of said frame *c d* are stationary behind the picket; but when the picket is in proper place the eccentric *a*, having revolved far enough, the frame *c d* begins to move and the fingers *e* to push the picket out endwise. At the same time the oscillating shaft S′, having completed its motion one way, through which no motion is transmitted by the wheel S, begins to move the other way. Immediately the wheels U, U′, and U″, the shafts on which they are mounted, and the twisting-fingers begin to turn. The twisting-fingers *i*, by reason of their helical shape acting like a screw upon the picket, assist the fingers *e* of the frame *c d* in pushing said picket outward from the twisting-heads, neither marring the picket nor being marred themselves by their contact therewith. After the picket in its outward motion has passed the points of the twisting-fingers, the said fingers, by reason of their rotary motion, twist the two wires held by each pair of fingers upon each other, so that they embrace the picket and are twisted between the fingers and the picket. When the picket has moved far enough from the twisting-fingers and sufficient length of wire has been twisted between the twisting-fingers and the picket, the eccentrics *a* draw back the frame *c d*. The oscillating shaft S′, having completed its stroke, turns the other way, the twisting apparatus ceases to revolve, and another picket is pushed into the machine by the slide *h*, ready to be worked into the fence, as above described. This may be continued until the machine has made a fence of sufficient length.

It is obvious that the shafts B B′ B″ may be placed at any convenient and desirable distance apart, so that the wire-spools may be made of any desired size. It is also obvious that there may be any desired number of these shafts—one for each separate line of wire to be woven into the fence. In any case, however, there must be one shaft carrying the twisting-fingers for each shaft carrying spools.

We claim as our invention—

1. A series of short rotary twisters mounted in bearings on a cross-bar, a series of independent spool-frames mounted in the rear of said twisters in independent bearings, in combination with mechanism for rotating said twisters at a variable speed, and mechanism for rotating said spool-frames at a uniform speed.

2. A series of short rotary twisters mounted in bearings on a cross-bar, mechanism for rotating said twisters at a variable speed, in combination with independent spool-frames located in the rear of said twisters and driving mechanism, and mechanism for rotating the spool-frames at a uniform speed.

3. The combination of a series of spool-frames, a series of independent twisters mounted in independent bearings in front of said spool-frames, and mechanism rotating said spool-frames and said twisters in the same direction and giving to said spool-frames a uniform speed and to said twisters a variable speed.

4. The combination of a series of spool-frames, a series of independent twisters mounted in independent bearings in front of said spool-frames, mechanism rotating said spool-frames with a uniform speed, and mechanism rotating said twisters at a higher rate of speed than the spool-frames, with periodical stoppages to permit the insertion of the pickets.

5. In a fence-making machine, the tubular helically-bent twisting-fingers *i*, mounted upon revoluble shafts journaled in the frame of said machine, and constructed and arranged substantially as and for the purpose set forth.

6. The combination, with the spool-frames and the twisters, of a driving-shaft connected with said spool-frames and giving them a continuous speed, a shaft driving said twisters, bevel-gears upon each of said shafts, a bevel-gear engaging both of said gears, and mechanism oscillating said last-named gear about the axes of said shafts, substantially as described.

In testimony whereof we have hereunto set our hands this 6th day of August, 1889.

ARTHUR A. PARKER.
JOHN F. LANDERS.

In presence of—
LEO SCHWAB,
G. W. L. JARMAN.